US011102243B1

(12) United States Patent
Plenderleith et al.

(10) Patent No.: US 11,102,243 B1
(45) Date of Patent: Aug. 24, 2021

(54) RESOURCE ADDRESS RESOLUTION BASED ON RESOURCE OWNERSHIP CHANGES TO BLOCK COMMUNICATIONS WITH COMPUTING RESOURCES

(71) Applicant: Amazon Technologies, Inc., Seattle, WA (US)

(72) Inventors: Jamie Plenderleith, Dublin (IE); Rostislav Babocichin, Bothell, WA (US); Parker J. Lord, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/453,127

(22) Filed: Jun. 26, 2019

(51) Int. Cl.
*H04L 29/06* (2006.01)
*H04L 29/12* (2006.01)

(52) U.S. Cl.
CPC ........ *H04L 63/1483* (2013.01); *H04L 61/103* (2013.01); *H04L 61/1511* (2013.01); *H04L 61/2046* (2013.01); *H04L 63/0876* (2013.01); *H04L 63/126* (2013.01); *H04L 63/1433* (2013.01)

(58) Field of Classification Search
CPC .................................................. H04L 63/1483
USPC .......................................................... 726/22
See application file for complete search history.

(56) References Cited

U.S. PATENT DOCUMENTS

| | | | | |
|---|---|---|---|---|
| 6,345,294 B1* | 2/2002 | O'Toole | ............. | G06K 13/0825 709/222 |
| 7,203,844 B1* | 4/2007 | Oxford | .................... | G06F 21/10 380/269 |
| 8,010,786 B1* | 8/2011 | Ward | ...................... | H04L 63/20 713/156 |
| 8,327,128 B1* | 12/2012 | Prince | ................. | H04L 63/0823 713/150 |
| 10,476,863 B1* | 11/2019 | Hanlon | ................. | H04L 63/105 |
| 10,911,535 B1* | 2/2021 | Cheng | ................. | H04L 67/1095 |

(Continued)

OTHER PUBLICATIONS

Cullen et al., "IT outsourcing configuration: Research into defining and designing outsourcing arrangements", 2005 (Year: 2005).*

(Continued)

*Primary Examiner* — Ondrej C Vostal
(74) *Attorney, Agent, or Firm* — Patterson + Sheridan, LLP (57) ABSTRACT

Method and apparatus for preventing communications with potentially compromised computing instances are described. An example method generally includes receiving, from a requesting device, a request to interact with the resource instance in the computing environment. A system examines current ownership information associated with the resource instance in the computing environment and determines that the resource instance is potentially compromised based, at least in part, on a determination that the ownership information associated with the resource instance has changed from the owner identified in a historical record to a second owner. Responsive to the determination that the resource instance is potentially compromised, the system takes action to manage communications with the resource instance so as to prevent the requesting device from sharing information with the resource instance.

20 Claims, 7 Drawing Sheets

(56) References Cited

U.S. PATENT DOCUMENTS

| | | | | |
|---|---|---|---|---|
| 2002/0188862 | A1* | 12/2002 | Trethewey | H04L 63/083 726/4 |
| 2003/0204742 | A1* | 10/2003 | Gupta | H04L 61/15 726/22 |
| 2005/0065799 | A1* | 3/2005 | Dare | H04L 63/0823 705/50 |
| 2007/0050376 | A1* | 3/2007 | Maida-Smith | H04L 67/02 |
| 2007/0061456 | A1* | 3/2007 | Waris | G06F 21/64 709/225 |
| 2007/0234055 | A1* | 10/2007 | Ohara | G06F 21/33 713/170 |
| 2011/0276477 | A1* | 11/2011 | Shuster | G06Q 30/08 705/39 |
| 2012/0167170 | A1* | 6/2012 | Shi | G06F 21/32 726/2 |
| 2012/0291100 | A1* | 11/2012 | Faitelson | G06Q 10/10 726/4 |
| 2013/0165072 | A1* | 6/2013 | Hoover | H04W 12/12 455/411 |
| 2017/0093586 | A1* | 3/2017 | Miranda | H04W 12/04 |
| 2017/0147827 | A1* | 5/2017 | Bowers | G06F 21/577 |
| 2018/0198876 | A1* | 7/2018 | Ma | H04L 67/22 |
| 2018/0253464 | A1* | 9/2018 | Kohli | G06F 16/219 |
| 2018/0314827 | A1* | 11/2018 | Wells | G06F 9/4401 |
| 2018/0316511 | A1* | 11/2018 | Meyer | H04W 12/42 |
| 2019/0050557 | A1* | 2/2019 | Martin | H04L 63/20 |
| 2019/0149342 | A1* | 5/2019 | Fynaardt | H04L 63/00 713/156 |
| 2020/0021446 | A1* | 1/2020 | Roennow | H04L 63/0478 |

OTHER PUBLICATIONS

Dibbern et al., "Information Systems Outsourcing: A Survey and Analysis of the Literature", 2004 (Year: 2004).*

Ghali et al., "Mitigating On-Path Adversaries in Content-Centric Networks", 2017 (Year: 2017).*

* cited by examiner

RESOURCE ADDRESS RESOLUTION BASED ON RESOURCE OWNERSHIP CHANGES TO BLOCK COMMUNICATIONS WITH COMPUTING RESOURCES

BACKGROUND

The present disclosure relates to address resolution of computing resources in a network, and more specifically, to resolving addresses of computing resources based on monitored changes in ownership information for computing resources in a network so as to prevent inadvertent communications with potentially compromised computing resources in the network.

DETAILED DESCRIPTION

Embodiments described herein describe techniques for preventing inadvertent communications with potentially compromised computing instances by resolving requests to communicate with a given computing instance based on changes in ownership information or other identifying information associated with the given computing instance. Generally, applications may attempt to communicate with services executing on a computing instance in a network by requesting address information for the computing instance through an address resolver (e.g., using Domain Name System (DNS) requests). While resolution of an address for a computing instance through an address resolver may indicate that the computing instance is accessible, resolution of the address may not provide any guarantee that the computing instance is owned or operated by any particular party. For example, in a cloud environment in which storage buckets may be provisioned for different users, the resolution of a storage bucket to a particular address may not indicate the actual owner of that storage bucket. Thus, it is possible in a bucket "sniping" attack for a malicious user to take control of a storage bucket (e.g., by generating a storage bucket using the name of a recently deleted storage bucket) such that applications that interact with the storage bucket continue to do so without realizing that the storage bucket is owned by a malicious user and may be collecting potentially sensitive information for malicious purposes. By continuing to interact with the storage bucket, applications may leak potentially sensitive information or secrets to parties that should not have access to such information.

Nom In another example, certificates may sometimes be used to provide information about a computing instance, such as the owner of the computing instance, keys for securing communications with the computing instance, and the like. Applications, however, may not actually examine certificates retrieved from a computing instance to determine whether the computing instance is who it presents itself to be prior to initiating communications with the computing instance. Rather, some applications may take the existence of a certificate as proof that the computing instance is who it presents itself to be. Thus, these applications may be susceptible to DNS poisoning attacks in which a malicious user self-signs a certificate, binds a certificate to a malicious server, and causes applications to communicate with the malicious server (rather than a legitimate server) by modifying the DNS entries identifying addresses of a server hosting a service associated with a given domain in order to redirect requests to the malicious server. These applications may also be susceptible to squatting attacks in which a malicious user obtains a domain that has recently expired, registers a certificate for the domain, and receives traffic intended for the computing systems on which the domain originally was hosted.

In some cases, it may be difficult for application developers to modify applications to communicate with different servers or perform the appropriate checks to determine whether an application is communicating with a legitimate server or a malicious server. For example, code used to communicate with a server may be included in a binary (e.g., a library) that a developer may not be able to modify. To prevent such applications from communicating with potentially malicious computing instances in a network, embodiments presented herein monitor ownership information associated with computing instances to determine how to resolve address requests for computing instances in a network. When historical and current ownership information for a computing instance match or substantially match, a system can assume that control of the computing instance has not moved from one party to another party and can resolve a request for address information associated with the computing instance to the current address of the computing instance. If, however, the system determines that differences exist between historical and current ownership information or other identifying information for a computing instance, the system can determine that the computing instance has potentially been compromised or that the address path for the computing instance has potentially been compromised. While it may not always be true that changes in ownership or other identifying information for a computing instance is malicious (e.g., when two organizations merge and ownership of the computing instances associated with one of the organizations is transferred to the other organization), embodiments presented herein can take action to cause an address resolution request for such computing instances to fail. By causing these requests to fail, embodiments presented herein may prevent or minimize a number of instances in which applications communicate with potentially compromised or malicious computing instances.

Figure 1:
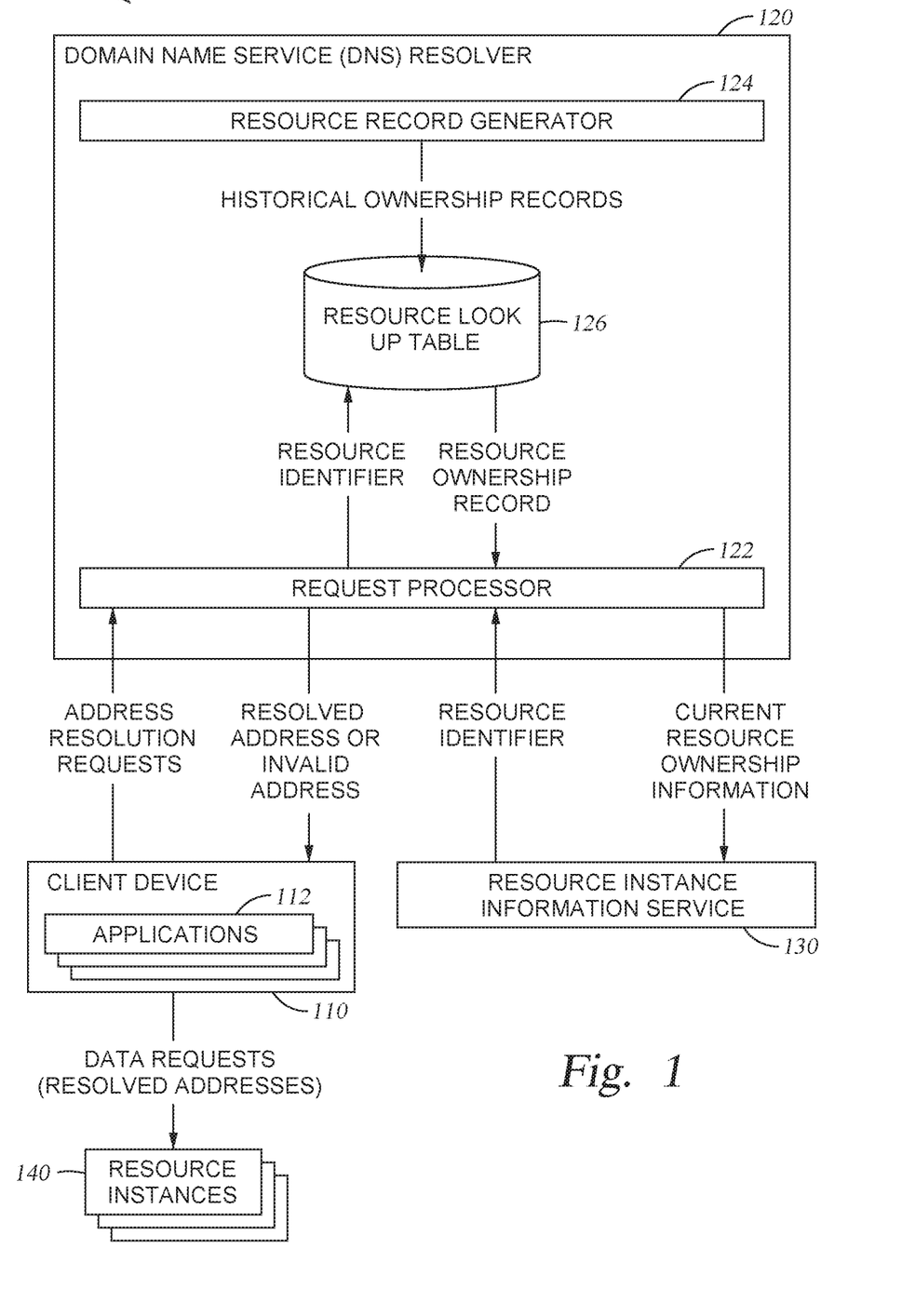
FIG. 1 illustrates an example computing environment in which historical and current computing resource ownership is used to determine how to resolve an address request for a computing instance to prevent inadvertent communications with potentially compromised computing resources, according to one embodiment.

FIG. 1 illustrates an example computing environment 100 in which ownership or other identifying information for computing instances in a network are monitored and used to determine how to resolve requests for address information associated with a given computing instance. As illustrated, computing environment 100 includes a client device 110, a domain name system (DNS) server 120, a resource instance information service 130, and one or more resource instances 140.

Client device 110 is illustrated to be representative of any computing device that may interact with resources in a computer network. Client device 110 may host one or more applications 112 having code depending on resources available at a given resource instance 140 and may be, for example, a laptop computer, a desktop computer, a tablet, a server hosting one or more applications, or other computing device that can interact with physical or virtual computing instances in network 100. As illustrated, when client device 110 attempts to communicate with a given resource instance 140, client device 110 may transmit an address resolution request to DNS server 120 and, in return, receive a resolved address from the DNS server 120. As discussed in further detail below, DNS server 120 performs analysis of identifying information for the resource instance to determine whether an address for the instance can be returned. For example, the DNS server 120 may return an address for a resource instance identified in an address resolution request, e.g., if differences between historical and current ownership and/or identifying information are not found or are below some threshold of a number of changes in identifying information for a resource instance in computing system 100. If the analysis results in a determination that an address cannot be returned, then the DNS server 120 may return information that causes the requesting application executing on client device 110 to fail. The information that may cause the application to fail may include, for example, a null value or other invalid address (e.g., a non-routable Internet Protocol (IP) address, such as 0.0.0.0 or 255.255.255.255, an IP address in a reserved block of addresses, a loopback address, etc.), an address directing the client device 110 to a notification hosted on a resource instance 140 indicating that the requested resource is potentially compromised, or the like.

In various embodiments, DNS server 120 may be representative of a request gateway in a cloud computing environment, a domain name server, or other system used in providing address information to a requesting application running on the client device 110 that the requesting application can then use to access various services in computing environment 100. As illustrated, DNS server 120 includes a request processor 122, a resource record generator 124, and a resource look up table 126. The resource look up table 126 contains records associating resource instances 140 in the computing environment 100 with historical ownership information and other information that may be used to track activity within computing environment 100. Current ownership information about the resource instances 140 is stored in a resource instance information service 130, which generally represents an ownership authority that tracks the current ownership of a given resource instance.

In operation, the DNS server 120 uses the information about a given resource instance 140 from the look up table 126 (historical information) and the resource instance information service 130 (current information) to determine how to respond to an incoming request to resolve an address of a resource instance 140 in the computing environment 100. Request processor 122 generally receives an address resolution request from an application executing on client device 110. The address resolution request may include a name of a resource instance 140 that the application executing on client device 110 is attempting to access, a Uniform Resource Locator (URL) of a computing resource, or other unique name identifying a computing resource in computing environment 100. Request processor 122 can use a domain name lookup service to retrieve an address of the named resource instance 140. For example, to retrieve an address of the named resource instance 140, request processor 122 can look up a routing record for the named resource instance 140 to identify a name server that maintains mappings between the named resource instance 140 and the address of the named resource instance 140. Upon receiving information identifying the name server, request processor 122 can query the name server for the address of the named resource instance 140. In another example, DNS server 120 may internally host routing tables or other records identifying the address of named resource instances 140 in computing environment 100. In this example, DNS server 120 may receive information identifying the name of a particular resource instance 140 in a cloud computing environment, such as a storage bucket or cloud computing instance, and request processor 122 can query the internal routing tables to identify an address of the named resource instance 140 in the request.

Once an address is resolved for a named resource instance 140 in computing environment 100, request processor 122 can compare historical ownership or identifying information for the named resource instance 140 to current ownership or identifying information to determine whether the named resource instance 140 is potentially compromised by an imposter attack. For example, in a cloud computing environment in which DNS server 120 serves as a gateway to resource instances 140 provisioned to users on request, request processor 122 can request ownership information and other identifying information for the named resource instance from a resource instance information service 130. As discussed in further detail below, resource instance information service 130 may maintain information about subscribers to resources in a cloud computing environment and information about the current owner of each resource instance 140 (e.g., storage buckets, cloud computing instances, etc.) in the cloud computing environment. Request processor 122 may further query a resource look up table 116 for a record associated with a particular resource identifier and, in response, receive a resource ownership record including at least the identifier of the resource instance and a historical owner of the resource instance. The historical owner of the resource instance may include, for example, the owner of a resource instance identified when the resource instance is initially created, the owner of a resource instance identified prior to an expiry time for the resource instance, or the like. Generally, ownership information captured when a resource instance is initially created or prior to expiration of the resource instance may prevent a malicious owner from being named as the historical owner of the resource instance, as ownership information may be captured and recorded in resource look up table 116 prior to a time at which a malicious owner could potentially take over a resource instance. In some embodiments, the resource ownership record may further be associated with information identifying an application that has historically interacted with the named resource instance and other information that may be used in determining whether a requesting application is attempting to communicate with a potentially compromised resource instance or, in some cases, whether an unknown and potentially compromised application is attempting to interact with the named resource instance.

If request processor 122 determines that the owner of the named resource instance identified in the resource ownership record matches the current owner of the named resource instance, request processor 122 can assume that the named resource instance has not been compromised by an impostor attack. Thus, request processor 122 can return the address of the named resource instance to the requesting application at client device 110, which, as discussed above, uses the returned address to transmit data and other requests to the named resource instance 140.

If, however, request processor 122 determines that the identified owner of the named resource instance in the resource ownership record is a mismatch to the current owner of the named resource instance, request processor 122 may take various actions to determine whether to resolve the address resolution request to the address of the named resource instance or fail the address resolution request. In one embodiment, request processor 122 can determine that the named resource instance is potentially compromised based on a determination that the current owner of the resource instance is not listed as the owner of the resource instance in the resource ownership record. In response to determining that the named resource instance is potentially compromised, request processor 122 can fail the address resolution request and inform a user of the requesting application on client device 110 that the named resource instance is potentially compromised.

A change in ownership may not itself indicate that a resource instance is potentially compromised. In some embodiments, request processor 122 can examine additional information and use heuristics based on the additional information to determine whether a resource instance is potentially compromised. For example, request processor 122 can examine historical records from resource instance information service 130 identifying timestamps at which the named resource instance was deleted by a first owner (e.g., the owner identified in the resource ownership record from resource look up table 116) and created by a second owner (e.g., the current owner of the resource instance). If a difference between the resource instance deletion and creation timestamps meets a threshold value, request processor 122 can infer that the named resource instance was the subject of a sniping attack and determine that the resource instance is potentially compromised.

In another example, request processor 122 can examine information associated with other resource instances owned by the current owner of the named resource instance to identify patterns of behavior that may be indicative of malicious activity within the computing environment. To do so, request processor 122 can query resource instance information service 130 for a list of resource instances owned by the current owner of the named resource instance. For each resource instance owned by the current owner of the named resource instance, request processor 122 can examine deletion and creation timestamp records to calculate an elapsed time between deletion of a resource instance by its original owner and creation of the resource instance by the second owner. If request processor 122 identifies a pattern of activity consistent with the current owner of the named resource instance creating resource instances shortly after those resource instances have been deleted by the original owner, request processor 122 can determine that the resource instances owned by the current owner of the named resource instance are all potentially compromised and can fail address resolution requests for any of these resource instances.

Resource processor 122 can additionally use other information about the previous and current owners of resource instances to determine whether a resource instance is potentially compromised. In one example, geographic information associated with the previous owners of the resource instances and the current owner of the resource instances can be used to determine whether resource instances are potentially compromised. Take, for example, a set of resource instances having previous owners distributed throughout North America. If each of these instances eventually end up with a current owner outside of North America, resource processor 122 can determine that the resource instances owned by the current owner of the named resource instance are all potentially compromised and can fail address resolution requests for any of these resource instances.

In some embodiments, request processor 122 may configure client device 110 or and/or resource instances 140 based on a determination that a resource instance 140 is potentially compromised. For example, request processor 122 may configure firewalls or other security applications executing on client device 110 to block requests to communicate with potentially compromised resource instance 140. In another example, request processor 122 may freeze or otherwise disable potentially compromised resource instances 140 until request processor 122 receives information indicating that the resource instances 140 have been reverted back to their previous owners or otherwise is not a security risk.

In some embodiments, DNS server 120 may handle requests to resolve addresses of external computing resources. To determine whether these external computing resources are potentially compromised, request processor 122 can use historical and current certificate information to determine whether an external computing resource is potentially compromised (e.g., through a DNS poisoning attack, a resource squatting attack, or other attack in which an impostor controls the external computing resource). To obtain a certificate associated with a named resource instance, request processor 122 can request certificates bound to predefined, conventionally used ports for given communications protocols. For example request processor 122 can request certificates bound to port 443 at the named resource instance 140 to obtain certificates used to authenticate secure hypertext transfer protocol (HTTPS) communications; certificates bound to port 22 to obtain certificates used to authenticate secure shell (ssh) communications; certificates bound to port 25 to obtain certificates used to authenticate secure mail transfer protocol (SMTP) communications; and the like. In some cases, while the resource instance 140 may perform communications using any given protocol on ports other than the predefined ports for the protocol, request processor 122 can infer that communications with the resource instance 140 on any port for a given protocol are authentic or potentially compromised based on determinations made between historical certificate information and current certificate information for certificates bound to the predefined ports for the protocol.

To determine whether a named resource instance 140 is potentially compromised based on historical and current certificate information associated with the resource instance 140, request processor 122 generally requests a record from resource look up table 116 including an identifier of the named resource instance 140 and information included in a certificate used to authenticate the named resource instance 140. The information included in the certificate may include, for example, information identifying the issuer of the certificate, the owner of the certificate, location information associated with the owner of the certificate, and other identifying information for which differences between a historical certificate and a current certificate may be probative of a potentially compromised resource instance 140. Request processor 122 can extract information from a current certificate received from the named resource instance 140 to determine whether the named resource instance 140 is potentially compromised. If the identifying information in the certificate is substantially similar (e.g., the owner and owner location are the same in the resource ownership record retrieved from resource look up table 116 and the current certificate retrieved from the named resource instance), request processor 122 can determine that the named resource instance 122 has not been compromised and may return the address of the named resource instance 140 to a requesting application on client device 110. If, however, request processor 122 identifies a threshold number of changes between the historical certificate and current certificate associated with the named resource instance 140, request processor 122 can determine that the named resource instance 140 is potentially compromised and can fail the address resolution request for the named resource instance 140.

In some embodiments, where DNS server 120 operates on a local network, identifying information for resource instances 140 executing within computing environment 100 may include Internet Protocol addresses and Media Access Control (MAC) addresses. To determine whether a resource instance 140 is potentially compromised, request processor 122 can use Address Resolution Protocol (ARP) messages to obtain the current MAC address of a resource instance 140 and can obtain a resource ownership record including a historical MAC address of the resource instance. Request processor 122 can use a subset of information in the current and historical MAC addresses to determine whether a resource instance 140 is potentially compromised. For example, request processor 122 can use the organizationally unique identifier (OUI) included in a MAC address to determine whether a manufacturer of a network interface installed on a resource instance 140 has changed. Based on a presumption that replacement network components would likely be manufactured by the same manufacturer as that of a replaced network component, request processor 122 can determine that a resource instance is not compromised if the OUI in the historical and current MAC addresses match. If, however, the OUI in the historical and current MAC addresses are a mismatch, request processor 122 can assume that the resource instance 140 is executing on a new device in computing environment 100 and determine that the resource instance 140 is potentially compromised.

Resource record generator 124 is generally configured to generate historical ownership records for resource instances 140 that request processor 122 can use to determine whether a resource instance is potentially compromised. In some embodiments, resource record generator 124 may generate records for resource instances 140 in computing environment 100 as DNS server 120 receives address resolution requests from a client device 100. If a named resource instance in an address resolution request is not found in resource look up table 116, request processor 122 can instruct resource record generator to generate a record in resource look up table 116 associating at least an identifier of the named resource instance with ownership or identifying information associated with the named resource instance. The ownership or identifying information associated with the named resource instance may be retrieved, for example, from a resource instance information service 130 (e.g., for resources in a cloud computing environment for which DNS server 120 acts as a request gateway) or from certificates retrieved from a named resource instance. In some embodiments, the record may further include information about applications generating requests to communicate with a named resource instance which, as discussed above, may be used to identify instances in which unknown and potentially malicious applications are attempting to retrieve information from or write information to a named resource instance.

In some embodiments, resource record generator 124 may periodically generate records for resource instances 140 that are expected to expire within a threshold amount of time. For example, resource record generator 124 may obtain a list of expiring domain names from a domain name provider or a WHOIS repository. For each domain name included in the list of expiring domain names, resource record generator 124 can attempt to obtain certificate information from the resource instances associated with the domain name and, if a certificate is found, generate a record associating the domain name with identifying information included in the certificate. By pre-seeding resource look up table 116 with information about domains that are expected to expire within some threshold amount of time, resource record generator 124 can preemptively generate historical ownership records that request processor 122 can use to determine whether a resource instance 140 is potentially compromised and, if so, fail an address resolution request identifying a potentially compromised resource instance 140.

Resource instance information service 130 generally exposes a service that maintains information about resource instances 140 in a computing environment 100 and owners of those resource instances. As discussed, when request processor 122 receives an address resolution request for a named resource instance 140 in computing environment 100, request processor 122 can query resource instance information service 130 for ownership information for the named resource instance. Request processor 122 may also query resource instance information service for information about resource instances owned by a particular user and other information about that user, which, as discussed above, may be used to identify resource instance 140 that are potentially compromised. In some embodiments, resource instance information service 130 may be an external name server that is configured to provide, to request processor 122, address information for a given domain name that request processor 122 can use to obtain certificate information for the given domain and determine whether resources associated with the domain are potentially compromised.

Figure 2:
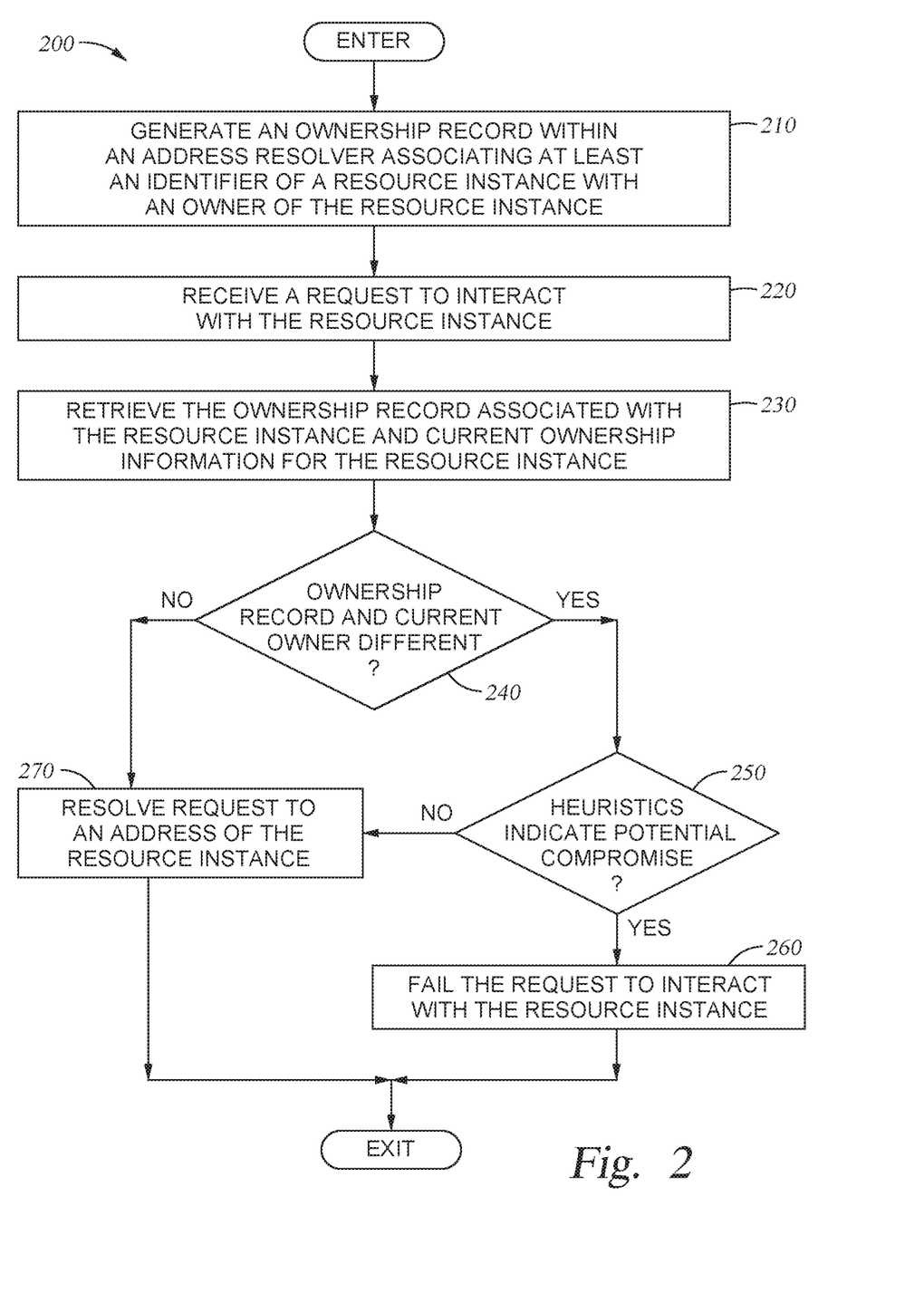
FIG. 2 illustrates example operations for resolving requests to interact with a resource instance in a computing environment based on comparisons of historical ownership records and current ownership information associated with the resource instance, according to one embodiment.

FIG. 2 illustrates example operations 200 that may be performed by an address request resolver (e.g., DNS server 120 illustrated in FIG. 1) to resolve addresses of a named resource instance based on a determination of whether the named resource instance is potentially compromised, according to an embodiment.

As illustrated, operations 200 begin at block 210, where a system generates an ownership record within an address resolver. The ownership record generally associates at least an identifier of a resource instance with an owner of the resource instance. For example, the identifier of the resource instance may include a name of the resource, a DNS record of the resource instance, or other information that uniquely identifies a resource instance in a computing environment. Ownership information for the resource instance may be received from a resource instance information service that maintains current ownership information for resource instances within a computing environment. In some embodiments, the ownership information may be extracted from certificates retrieved from the resource instance.

At block 220, the system receives (e.g., from a requesting process executing on a client device 110) a request to interact with the resource instance. The request to interact with the resource instance may include, for example, an address resolution request generated by an application on a client device used to obtain the address of the resource instance on which an operation is to be performed. In some embodiments, the request may be a request to perform a specified action against a named resource instance in a computing environment. In processing a request to perform a specified action against a named resource instance in the computing environment, the system may resolve the address of the named resource instance identified in the request in order to determine whether to allow or disallow execution of the specified action.

At block 230, the system retrieves the ownership record associated with the resource instance and current ownership information for the resource instance. The ownership record associated with the resource instance may be retrieved from a look up table local to or accessible by the address resolver that stores the generated records associating identifiers of resource instances with historical ownership information for the resource instances. The current ownership information for the resource instance may be retrieved from a resource instance information service or by extracting ownership information from a certificate currently issued for the resource instance.

At block 240, the system determines whether the owner identified in the ownership record and the current owner are different. If, at block 240, the system determines that the owner identified in the ownership record and the current owner are identical, operations 200 may proceed to block 270, described below, to resolve the request to interact with the resource instance. If, however, the owner identified in the ownership record and the current owner are different, the system may determine that further examination of information associated with the resource instance is warranted, and operations 200 may proceed to block 250.

At block 250, the system can use various heuristics to determine whether the resource instance is potentially compromised. These heuristics may include timing information between deletion of the resource instance by the owner identified in the ownership record and creation of the resource instance by the current owner, geographic information about the owner identified in the ownership record and the current owner, activity performed within the computing environment by the current owner, and the like. For example, elapsed times between deletion of the resource instance by the owner identified in the ownership record and creation of the resource instance by the current owner that are meet a timing criteria may indicate that the resource instance was the target of a squatting or impersonation attack and is thus potentially compromised. Owner geographic locations that significantly differ may also indicate that a resource instance is potentially compromised. Still further, patterns of activity indicating that the current owner of the resource instance owns resource instances that were previously owned by various other parties may indicate that resource instances owned by the current owner are all potentially compromised.

If, at block 250, a heuristic analysis of the current owner of the resource instance indicates that the resource instance is potentially compromised, at block 260, the system fails the request to interact with the resource instance. By failing the request to interact with the resource instance, the system can prevent applications executing on a client device from potentially leaking sensitive data to or otherwise interacting with potentially compromised computing instances that are designed to exfiltrate sensitive data out of an organization, inject malicious software into a client device, or otherwise perform malicious actions within a computing environment 100. In some embodiments, failing the request may include returning, to a client device, an invalid Internet Protocol address (e.g., a non-routable Internet Protocol address) or an address directing the client device to a different computing resource (e.g., a resource configured to display an alert to a user indicating that the resource instance 140 is potentially compromised). In some embodiments, failing the request may include discarding the request such that the request times out, returning an error code, or otherwise failing to execute an action identified in the request.

If, however, at block 250, the heuristic analysis of the current owner of the resource instance indicates that the resource instance is not compromised, operations 200 may proceed to block 270, where the system resolves the request to interact with the resource instance to an address of the resource instance. After resolving a request to interact with the resource instance to the address of the resource instance, the system can return the resolved address to a requesting client device or use the resolved address to execute a request to perform a specified action on the resource instance.

Figure 3:
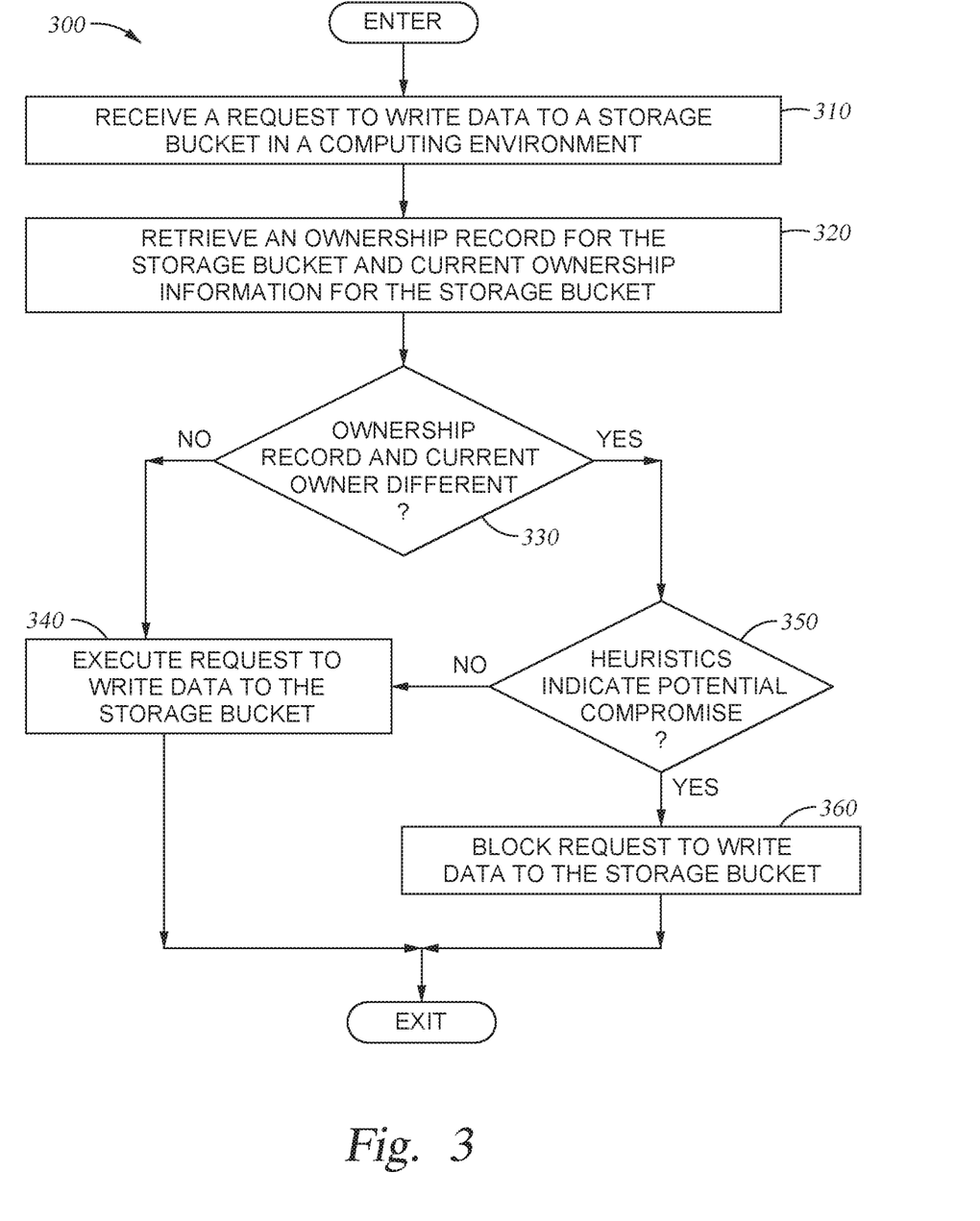
FIG. 3 illustrates example operations for resolving requests to write data to a storage bucket in a computing environment based on comparisons of historical ownership records and current ownership information associated with the storage bucket, according to one embodiment.

FIG. 3 illustrates example operations that may be performed by an address request resolver to process write requests against storage buckets in a cloud computing environment based on a determination of whether an identified storage bucket is potentially compromised (e.g., by a bucket sniping attack), according to an embodiment.

As illustrated, operations 300 begin at block 310, where a system receives (e.g., from a requesting process executing on a client device 110) a request to write data to a storage bucket in a computing environment. The request may include the data to be written to the storage bucket and information identifying the storage bucket, such as a name of a storage bucket of a Uniform Resource Locator (URL) identifying the storage bucket. In some embodiments, a URL identifying the storage bucket may be formatted as "storagebucketname.storageservice.com", such that the storage bucket may be resolved to a unique Internet Protocol (IP) address. In another example, a URL identifying the storage bucket may be formatted as "storageservice.com/storagebucketname/" such that performing address resolution on the URL may not identify a resource instance on which the storage bucket resides. To retrieve ownership information for the storage bucket in such an embodiment, the system may use the URL format to identify the name of the storage bucket and retrieve information about the storage bucket from a resource instance information service.

At block 320, the system retrieves an ownership record for the storage bucket and current ownership information for the storage bucket. The ownership record for the storage bucket may be retrieved from a look up table maintained by an address resolver for tracking historical ownership of different storage buckets in a computing environment. Current ownership information for the storage bucket may be retrieved from a resource instance information service, as discussed above.

At block 330, the system determines whether the owner identified in the ownership record and the current owner are different. If the system determines that the owner identified in the ownership record and the current owner are the same, operations 300 may proceed to block 340, where the system executes the request to write data to the storage bucket. Otherwise, operations 300 may proceed to block 350, where the system performs a heuristic analysis to determine whether the heuristics indicate that the storage bucket is potentially compromised. As discussed, the heuristic analysis may examine information such as elapsed time between storage bucket deletion and creation, geographic information associated with the previous and current owners of the storage bucket, storage bucket creation activity by the current owner of the storage bucket, and other information that may be indicative of whether the current owner of the storage bucket is engaged in potentially malicious behavior.

If, at block 350, the system determines that the storage bucket is potentially compromised, the system blocks the request to write data to the storage bucket. In some embodiments, blocking the request to write data to the storage bucket may be performed by blackholing or otherwise discarding requests to write data to the storage bucket. The system may additionally return an error message to the client device from which the request was received, which may allow applications executing on the client device to fail fast and discontinue future attempts to write data to the storage bucket. Otherwise, if the system determines that the storage bucket is not compromised based on the heuristic analysis, operations 300 may proceed to block 340, where, as discussed, the system executes the request to write data to the storage bucket.

Figure 4:
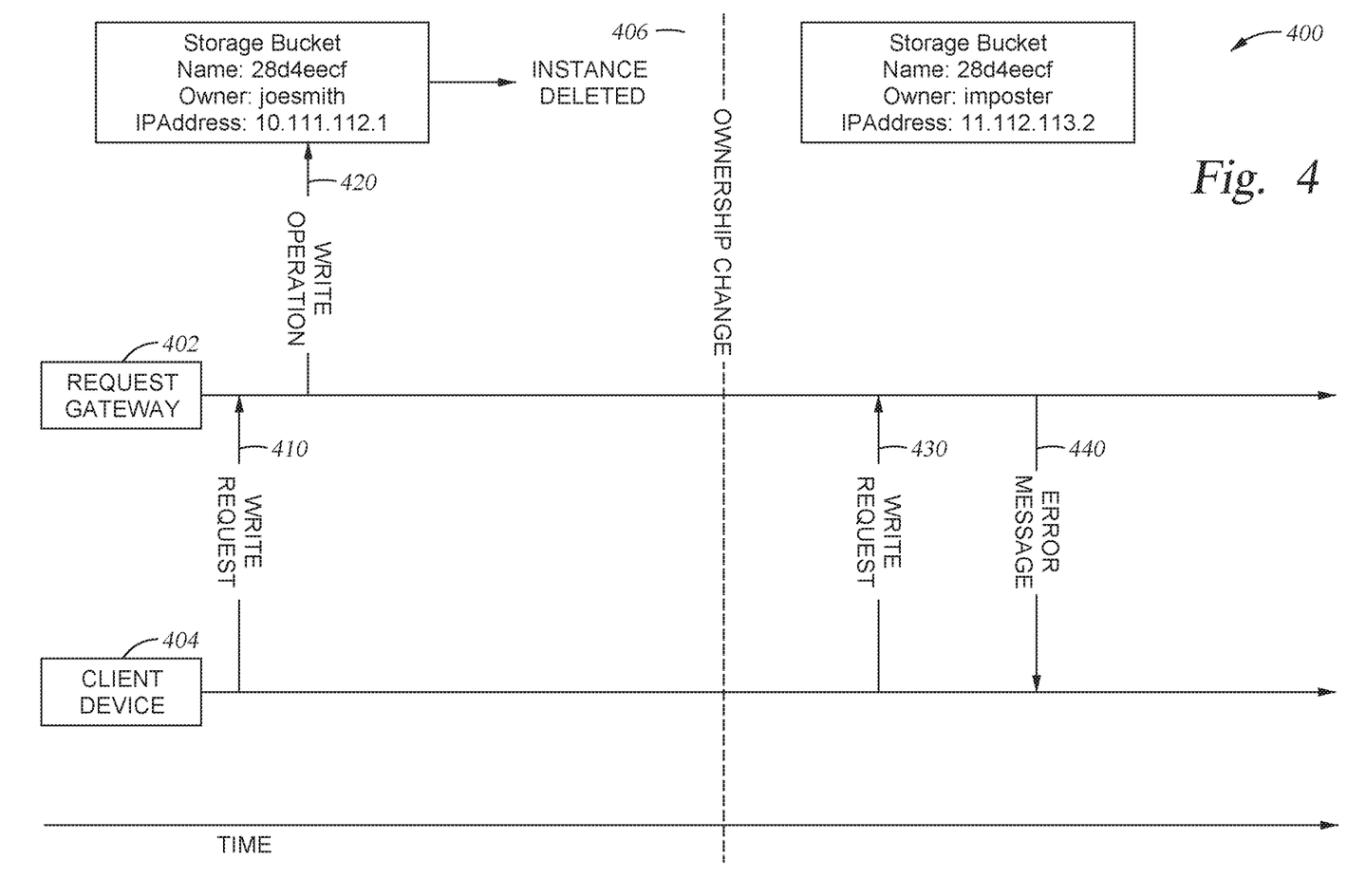
FIG. 4 illustrates an example timeline of changes in ownership information associated with a storage bucket in a computing environment and address resolutions performed prior to and after the ownership information associated with the storage bucket changes, according to one embodiment.

FIG. 4 illustrates an example timeline 400 of write operations performed against a storage bucket in a computing environment, according to an embodiment. As illustrated, a storage bucket with the identifier "28d4eecf" initially is owned by the user "joesmith" and resolves to an IP address of 10.111.112.1. At a time represented by ownership change 406, ownership of the storage bucket changes to the user "imposter" and resolves to a new IP address of 11.112.113.2. As illustrated, the ownership change 406 may be effected by the user "joesmith" deleting the storage bucket and the user "imposter" creating a new storage bucket with the same identifier.

Request gateway 402 initially receives a write request 410 from client device 404 requesting that data be written to storage bucket "28d4eecf". Request gateway 402 obtains a historical ownership record from an internal resource look up table indicating that the storage bucket was previously owned by the user "joesmith" and resolves to the IP address 10.111.112.1. Because the historical and current ownership information match, request gateway 402 can determine that the write request should be allowed to execute against the storage bucket. Thus, request gateway 402 executes a write operation 420 against the storage bucket to commit the information included in write request 410 to the storage bucket.

At some time after ownership change 406, request gateway 402 receives a write request 430 to write data to the storage bucket with the identifier "28d4eecf". Request gateway 402 can compare a historical ownership record associated with the storage bucket "28d4eecf" with current ownership information for the storage bucket "28d4eecf" and determine that the owner of the storage bucket has changed from "joesmith" to "imposter". Because the previous and current owner of the storage bucket are different entities, request gateway 402 can determine that the write request 430 should not be executed. Based on the determination that the write request 430 should not be executed, request gateway 402 can transmit an error message 440 to client device 404 indicating that the write request 430 was not executed. In some embodiments, error message 440 may include additional information indicating a reason for failing to execute the write request 430 (i.e., that the write request was discarded because the storage bucket is potentially compromised). In some embodiments, the error message 440 may further include information that client device 404 can use to configure a firewall or other traffic controller to block future traffic to the storage bucket.

While FIGS. 3-4 describe allowing or disallowing write operations from being performed on storage buckets in a computing environment, it should be understood that the foregoing techniques may be used to allow or disallow various actions from being performed against various types of computing instances in the computing environment. For example, the techniques described herein can be used to determine whether to allow or disallow a requesting application from invoking a function on a remote computing instance to perform an action with respect to data provided by the requesting application. In another example, the techniques described herein may be used to determine whether to allow or disallow an application from obtaining data, executable code, libraries, or the like from a computing instance to prevent the requesting application from obtaining potentially compromised data or code from a potentially compromised computing instance.

Figure 5:
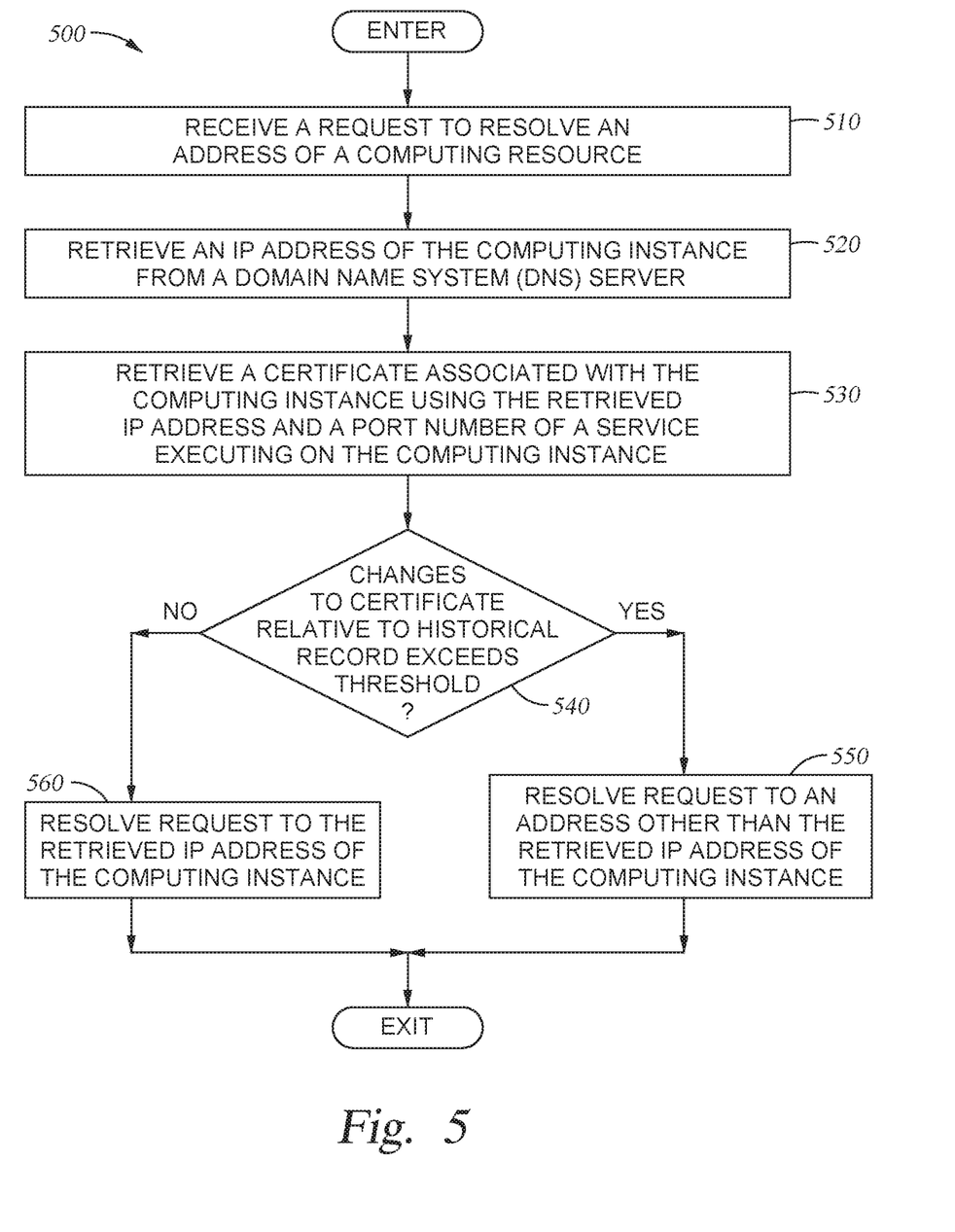
FIG. 5 illustrates example operations for resolving requests for an address of a computing instance based on changes detected between historical and current certificates assigned to the computing instance, according to one embodiment.

FIG. 5 illustrates example operations that may be performed by an address request resolver to process address requests for computing instances based on differences in historical and current certificates bound to a computing instance, according to embodiment.

As illustrated, operations 500 may begin at block 510, where a system receives (e.g., from a requesting process executing on a client device 110) a request to resolve an address of a computing resource. The request may be, for example, a DNS request identifying a domain name for which an Internet Protocol (IP) address is requested.

At block 520, the system retrieves an IP address of the computing instance from the domain name system (DNS) server (such as the DNS server 120 shown in FIG. 1). To retrieve an IP address of the computing instance, the system may request a DNS record for the computing instance identifying one or more name servers maintaining an association between a domain name of the computing instance and an IP address of the computing instance. The system can query one of the identified name servers to retrieve the IP address of the computing instance.

At block 530, the system retrieves a certificate associated with the computing instance using the retrieved IP address and a port number of a service executing on the computing instance. In some embodiments, the system may not have information about specific ports on which services execute on the computing instance. To retrieve a certificate associated with the computing instance, the system can retrieve a certificate bound to a predefined port at a computing instance located at the retrieved IP address. The predefined port may be a port typically used for a particular service for which a certificate may be used to authenticate and secure communications with the computing instance, such as port 443 for secure hypertext transfer protocol (HTTPS) communications, port 22 for secure shell (SSH) communications, port 25 for secure mail transfer (SMTP) communications, and other predefined ports on which secured communications may typically be performed.

At block 540, the system determines whether changes to the current certificate relative to a historical record exceed some threshold amount of change. In determining whether the changes to the current certificate relative to a historical record exceeds some threshold amount of change, the system can, for example, count a number of identifying fields that have been changed in the new certificate. These identifying fields may include, for example, owner name, organizational unit, city, state/province, country, and other information included in a certificate that identifies an owner or controlling party of a computing instance. A number of changes to a certificate, such as the issuing certificate authority or a change in the encryption key identified in a certificate may not alone indicate that a computing instance is potentially compromised; however, changes in other information in the certificate may indicate that the computing instance is potentially compromised.

If, at block 540, the system determines that the changes to the current certificate relative to a historical record exceeds a threshold amount of change, operations 500 proceed to block 550, where the system resolves the request to an address other than the retrieved IP address of the computing instance. The address returned by the system may be, for example, a non-routable IP address, a reserved IP address, or an IP address pointing to a service through which notifications that the computing instance is potentially compromised may be delivered. Otherwise, if the system determines that the changes to the current certificate relative to a historical record does not exceed a threshold amount of change, operations 500 proceed to block 560, where the system resolves the request to the retrieved IP address of the computing instance.

Figure 6:
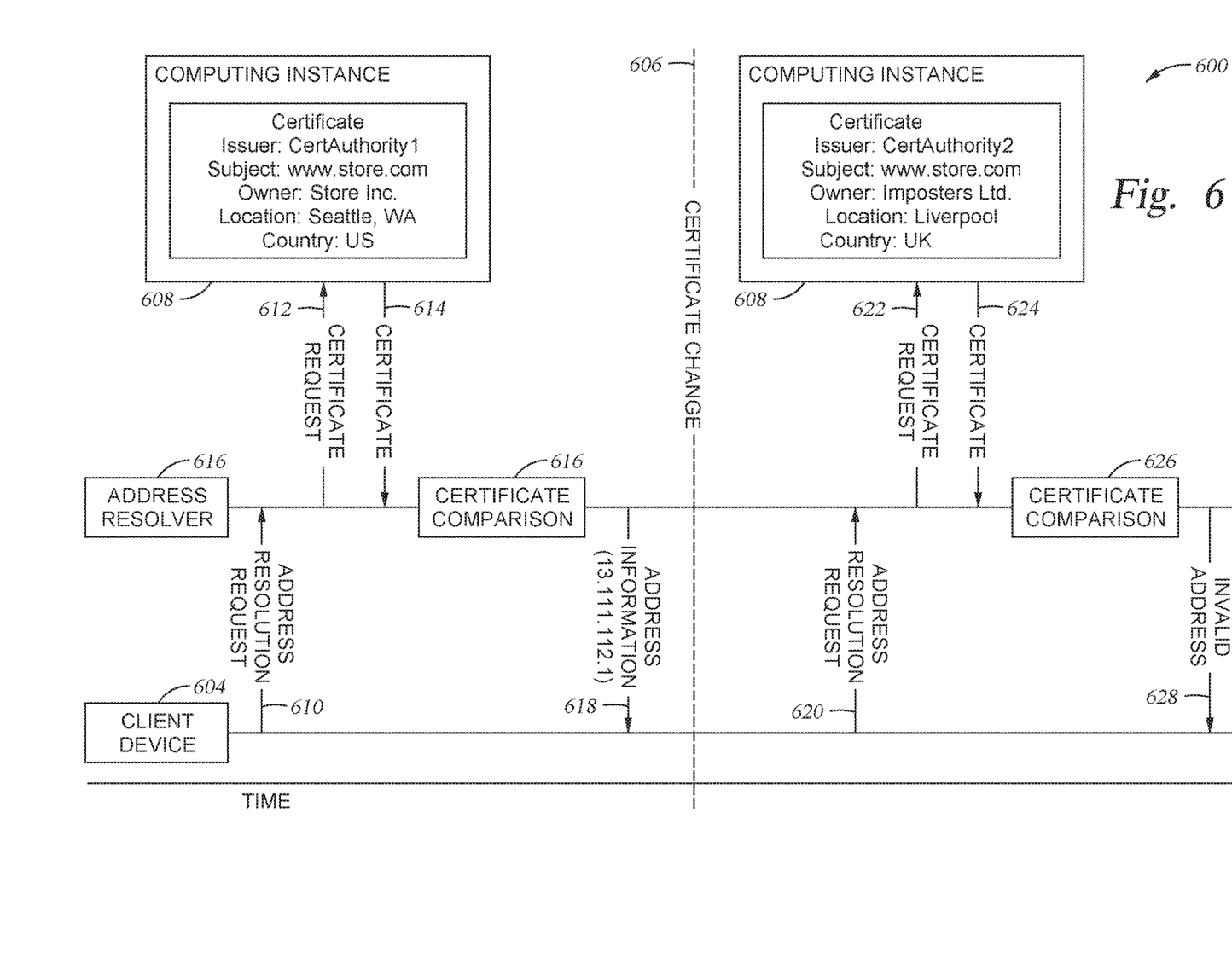
FIG. 6 illustrates an example timeline of changes to certificates assigned to a computing instance and address resolutions performed prior to and after the certificates assigned to a computing instance change, according to one embodiment.

FIG. 6 illustrates an example timeline 600 of operations that may be performed to resolve a request for an address of a named computing system based on determinations of whether the named computing system is potentially compromised, according to an embodiment. As illustrated, a computing instance at the address "www.store.com" initially is associated with a certificate, issued by CertAuthority1, indicating that the computing instance is owned by Store Inc. and is located in Seattle, Wash. in the United States. At a time represented by certificate change 606, the certificate associated with the computing instance at the address "www.store.com" changes to a certificate, issued by CertAuthority2, indicating that the computing instance is owned by Imposters Ltd. and is located in Liverpool in the United Kingdom.

Address resolver 602 initially receives an address resolution request 610 from a client device 604 requesting the IP address associated with "www.store.com". In response, to determine whether to return the IP address associated with "www.store.com" or some other IP address (e.g., an address used to indicate that a requested computing resource is potentially compromised), address resolver 602 transmits a certificate request 612 to computing instance 608, and computing instance 608 responds with certificate 614, indicating that the address "www.store.com" is hosted on a computing instance owned by Store Inc. and is located in Seattle, Wash. in the United States. Address resolver 602 performs a comparison 616 between historical certificate information stored in a resource look up table at address resolver 602 and the received certificate 614. In this case, because the information in received certificate 614 matches the historical certificate information stored in the resource look up table for the "www.store.com" resource, address resolver 602 can determine that "www.store.com" has not been compromised and may return the IP address associated with "www.store.com" to client device 604 in address information message 618.

At some time after certificate change 608, address resolver 602 receives an address resolution request 620 requesting the IP address associated with "www.store.com". In response to receiving address resolution request 620, address resolver 602 transmits a certificate request 622 to computing instance 608, and computing instance 608 responds with the new certificate 624. Certificate 624, as illustrated, indicates that the address "www.store.com" is hosted on a computing instance owned by Imposters Ltd. and is located in Liverpool in the United Kingdom. Address resolver 602 performs a comparison of the historical certificate information stored in the resource look up table for the "www.store.com" resource to certificate 624 and identifies that the certificate authority, owner, location, and country information in certificate 624 is different from that included in a historical record. Based on this comparison, address resolver 602 can determine that "www.store.com" is potentially compromised and can transmit an invalid address 628 to client device 604 to resolve address resolution request 620. As discussed, by transmitting an invalid address to a client device in response to an address resolution request, the address resolver can prevent the client device from communicating with a potentially compromised computing instance.

Figure 7:
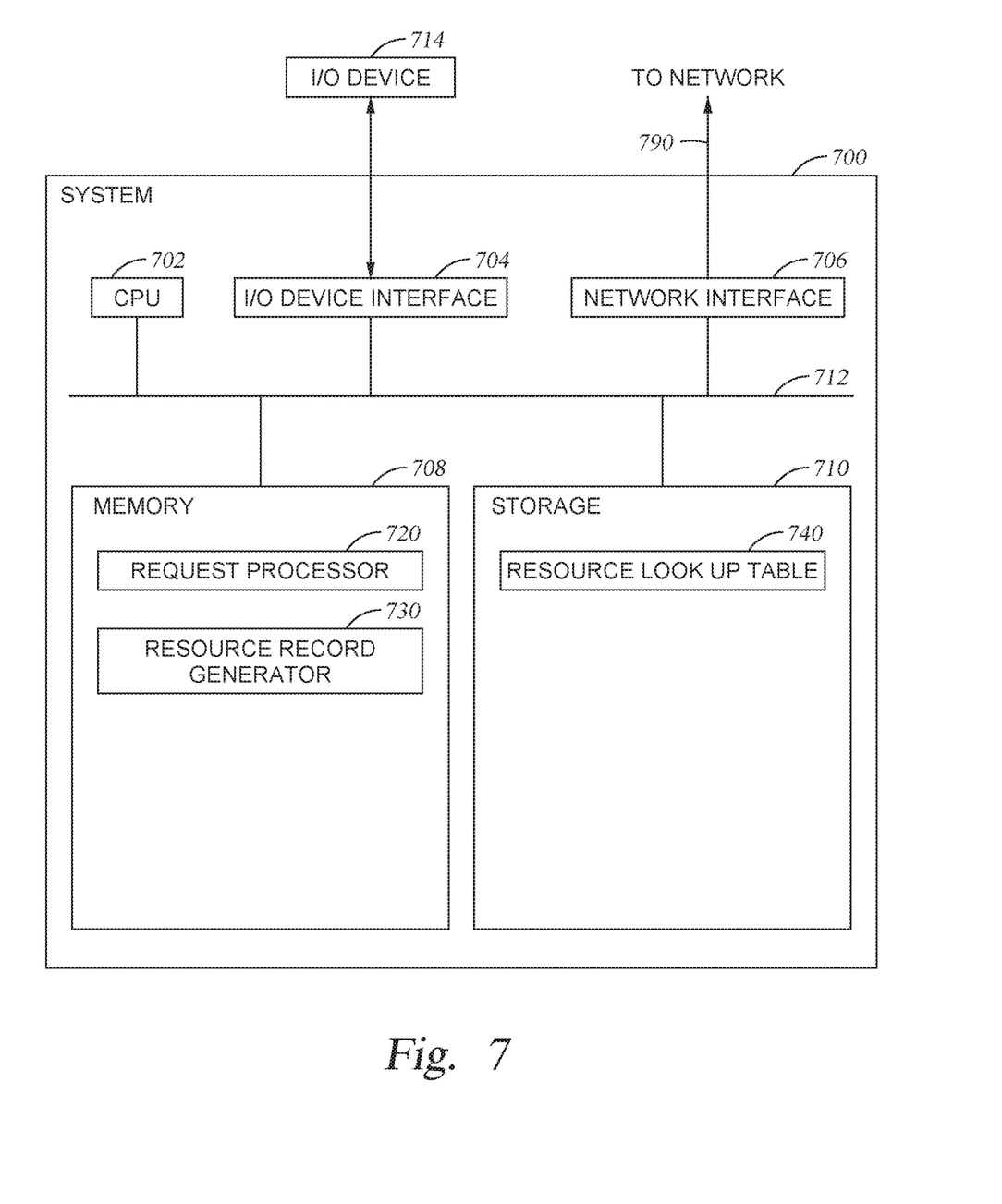
FIG. 7 illustrates an example computing system in which aspects of the present disclosure may be performed.

FIG. 7 illustrates an example system for resolving addresses of resource instances in a computing environment based on historical and current ownership information to prevent applications executing on client devices from communicating with potentially compromised resource instances, according to embodiments of the present disclosure.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and the like. Additionally, the memory 708 is included to be representative of a random access memory. Furthermore, the storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 generally includes an request processor 720 and a resource record generator 730. Request processor 720 is generally configured to receive requests to interact with a named resource instance in a computing environment, such as a resource identified by a domain name, a storage bucket name, or the like. Request processor 720 generally retrieves historical and current ownership information or other identifying information of the named resource instance and compares the historical and current ownership information or other identifying information to determine whether to resolve a received request to the IP address of the named resource instance (e.g., the IP address included in a domain name system record for the named resource instance) or generate an error to prevent the client device from communicating with a potentially compromised resource instance. If the historical and current ownership or identifying information match, request processor 720 can determine that the resource instance has not been compromised and can resolve the received request to the IP address of the named resource instance. Otherwise, request processor 720 can resolve the received request to an invalid IP address so that communications with the named resource instance fail. Resource record generator 730 generally generates historical ownership records for resource instances in a computing environment that address resolver can use to identify ownership changes for resource instances in a computing environment and determine whether to resolve a request to interact with a resource instance to an IP address of the resource instance or an invalid IP address.

Storage 710 generally comprises a resource look up table 740. Resource look up table 740 generally includes one or more records associating a named resource instance in a computing environment to an owner of the resource instance. The records stored in resource look up table 740 may be generated, for example, when resource instances are initially created in a computing instance, prior to expiry of a domain name, or the like. These records may be provided to request processor 720, upon request, for request processor 720 to determine whether to resolve the address of a named resource instance to the IP address of a named resource instance or an invalid IP address, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud through address resolution services described herein. For example, the address resolver could execute on a computing system in the cloud and use comparisons between historical and current ownership information associated with computing instances in the cloud to determine how to resolve requests to interact with computing instances in the cloud. In such a case, the address resolver could perform address resolution and store records associating computing instances and ownership information or other identifying information at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method to resolve requests for addresses of resources in a computing environment based on detection of impersonation attacks against computing instances in the computing environment, comprising:
   generating a record associating at least an identifier of a resource instance in the computing environment with an owner of the resource instance in the computing environment;
   receiving, at a domain name system (DNS) server, a request from a requesting process to resolve an Internet Protocol (IP) address of the resource instance in the computing environment;
   retrieving current ownership information for the resource instance in the computing environment from an ownership authority in the computing environment;
   determining that the resource instance is potentially compromised based, at least in part, on a determination that the current ownership information for the resource instance has changed from the owner identified in the record to a second owner; and
   responsive to the determination that the resource instance is potentially compromised, taking action to resolve the IP address of the resource instance so as to prevent the requesting process from sharing information with the resource instance.

2. The method of claim 1, wherein generating the record further comprises:

associating an application generating requests to interact with the resource instance with the identifier of the resource instance and the owner of the resource instance.

3. The method of claim 2, wherein the request includes information identifying the application, and wherein determining that the ownership information associated with the resource has changed comprises:
retrieving the record associating the application with the identifier of the resource instance in the computing environment and the owner of the resource instance in the computing environment; and
comparing the current ownership information for the resource instance to the owner of the resource instance identified in the record.

4. The method of claim 1, further comprising:
identifying a deletion timestamp of the resource instance by the owner identified in the record;
identifying a creation timestamp of the resource instance by the second owner of the resource instance; and
determining that the resource instance is compromised by an impersonation attack based on a difference between the identified deletion and creation timestamps.

5. The method of claim 1, further comprising:
identifying resource instances owned by the second owner for which records indicate that other resource instances are owned by other owners;
identifying elapsed times between deletion timestamps and creation timestamps for the resource instances owned by the second owner; and
based on a pattern of activity of elapsed times between resource instance deletion and the second owner acquiring resource instances being within a threshold amount of time, determining that the resource instances owned by the second owner are potentially compromised resource instances.

6. The method of claim 1, wherein the identifier of the resource instance comprises a DNS record resolving an address of the resource instance to an internet protocol (IP) address.

7. The method of claim 6, further comprising:
updating records associated with the resource instance based on a time to live (TTL) value included with the DNS record.

8. The method of claim 1, wherein the identifier of the resource instance comprises a Media Access Control (MAC) address of the resource instance; and wherein determining that the resource instance is potentially compromised is further based on detecting that a current MAC address of the resource instance is a mismatch with the MAC address included in the record.

9. The method of claim 1, wherein the action comprises one or more of:
failing the request to resolve the Internet Protocol address of the resource instance by resolving the request to an invalid Internet Protocol address, or
redirecting the request to a resource configured to provide, to the requesting process, an alert indicating that ownership of the resource instance has changed to the second owner.

10. A method to detect impersonation attacks in a computing environment, comprising:
generating a record associating a computing instance in the computing environment with certificate information for the computing instance in the computing environment;
receiving, from a requesting process, a request to interact with the computing instance in the computing environment;
resolving an address of the computing instance;
retrieving a currently valid certificate from the computing instance using the resolved address and a specified port on which a certificate is bound;
identifying differences between information from the currently valid certificate to the information and the certificate information in the record;
based on the identified differences, determining that the computing instance is potentially compromised; and
taking action to manage communications with the computing instance so as to prevent the requesting process from sharing information with the computing instance.

11. The method of claim 10, wherein generating the record associating the computing instance in the computing environment comprises generating records for domain names expired within a threshold amount of time.

12. The method of claim 10, wherein the specified port comprises one or more predefined ports used for communications by the computing instance using a given communications protocol.

13. The method of claim 12, further comprising:
inferring, based on the identified differences, that services using the given communications protocol on ports other than the predefined ports are also potentially compromised.

14. The method of claim 10, wherein determining that the computing instance is potentially compromised comprises determining that at least a threshold number of changes to certificates associated with the computing instance have been made over a time window.

15. The method of claim 10, wherein taking action to manage communications with the computing instance comprises one or more of:
failing a request to resolve an address of the computing instance, or
resolving the request with an address of a resource configured to provide, to the requesting process, an alert indicating that the computing instance is potentially compromised.

16. A method to prevent actions from being executed against potentially compromised computing resources in a computing environment, comprising:
generating a record associating an identifier of a computing resource in the computing environment with an owner of the computing resource in the computing environment;
receiving, from a requesting process, a request to execute an action on the computing resource;
examining current ownership information for the computing resource in the computing environment;
determining that the computing resource is potentially compromised, comprising:
determining that the ownership information associated with the computing resource has changed from the owner identified in the record to a second owner; and
blocking the request to execute the action on the computing resource.

17. The method of claim 16, wherein determining that the computing resource is potentially compromised is further based on differences between geographic location information of the owner identified in the record and geographic location information of the second owner.

18. The method of claim 16, wherein determining that the computing resource is potentially compromised further comprises:
   identifying a pattern of the second owner acquiring computing instances within a threshold amount of time of other owners deleting the computing instances.

19. The method of claim 18, further comprising:
   marking the computing instances owned by the second owner as potentially compromised;
   receiving a request to execute an action on a computing instance owned by the second owner; and
   blocking the request based on the computing instances owned by the second owner being marked as potentially compromised.

20. The method of claim 16, wherein blocking the request to execute an action on the computing resource comprises resolving an Internet Protocol (IP) address of the computing resource to an IP address other than an IP address associated with the computing resource.

* * * * *